(12) United States Patent
Wang et al.

(10) Patent No.: US 11,967,228 B2
(45) Date of Patent: Apr. 23, 2024

(54) PECCANCY MONITORING SYSTEM AND PECCANCY MONITORING METHOD

(71) Applicant: STREAMAX TECHNOLOGY CO., LTD., Shenzhen (CN)

(72) Inventors: Rui Wang, Shenzhen (CN); Zhiwei Ma, Shenzhen (CN)

(73) Assignee: STREAMAX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/754,094

(22) PCT Filed: Feb. 12, 2020

(86) PCT No.: PCT/CN2020/074888
§ 371 (c)(1),
(2) Date: Apr. 6, 2020

(87) PCT Pub. No.: WO2021/159310
PCT Pub. Date: Aug. 19, 2021

(65) Prior Publication Data
US 2022/0375341 A1   Nov. 24, 2022

(51) Int. Cl.
*H04N 7/18* (2006.01)
*G06T 3/40* (2006.01)
(Continued)

(52) U.S. Cl.
CPC ............. *G08G 1/0175* (2013.01); *G06T 3/40* (2013.01); *G06T 7/20* (2013.01); *G06T 7/70* (2017.01);
(Continued)

(58) Field of Classification Search
USPC ........................................................ 348/149
See application file for complete search history.

(56) References Cited

U.S. PATENT DOCUMENTS

| | | | | |
|---|---|---|---|---|
| 5,382,953 A | * | 1/1995 | Hauptli | G08G 1/0175 348/148 |
| 5,444,444 A | * | 8/1995 | Ross | B07C 3/00 340/988 |

(Continued)

FOREIGN PATENT DOCUMENTS

| | | |
|---|---|---|
| CA | 2985266 A1 | 5/2018 |
| CN | 107077785 A | 8/2017 |

(Continued)

OTHER PUBLICATIONS

China Office Action for China Application No. 202080000109.9; Action dated Sep. 6, 2021, 7 pages.

(Continued)

*Primary Examiner* — Nigar Chowdhury
(74) *Attorney, Agent, or Firm* — CANTOR COLBURN LLP (57) ABSTRACT

A peccancy monitoring system and a peccancy monitoring method are provided in the present application. The peccancy monitoring system includes: a first camera, configured to monitor whether a peccancy vehicle is present in a designated area and generate alarm message when the peccancy vehicle is present; a control unit, connected to the first camera and configured to trigger the second camera to shoot according to the alarm message; a second camera, connected to the control unit and configured to shoot the peccancy vehicle to acquire a video of the vehicle and an image of the vehicle, here the video of the vehicle is a video containing a license plate of the peccancy vehicle and the image of the vehicle is an image containing the license plate of the peccancy vehicle. By using the technical solutions in the present application, the road can be monitored after the school bus is docked.

9 Claims, 3 Drawing Sheets

(51) Int. Cl.
*G06T 7/20* (2017.01)
*G06T 7/70* (2017.01)
*G06V 20/58* (2022.01)
*G06V 20/62* (2022.01)
*G08G 1/017* (2006.01)

(52) U.S. Cl.
CPC ............ *G06V 20/58* (2022.01); *G06V 20/625* (2022.01); *G06T 2207/30236* (2013.01); *G06T 2207/30252* (2013.01); *G06V 2201/08* (2022.01)

(56) References Cited

U.S. PATENT DOCUMENTS

| | | | |
|---|---|---|---|
| 5,510,764 A | 4/1996 | Hauptli | |
| 5,793,420 A * | 8/1998 | Schmidt | B60R 1/00 348/E7.086 |
| 6,542,076 B1 | 4/2003 | Joao | B60R 25/102 340/425.5 |
| 6,542,077 B2 * | 4/2003 | Joao | B60R 25/102 340/425.5 |
| 7,812,711 B2 * | 10/2010 | Brown | G08G 1/0175 340/439 |
| 8,599,260 B1 | 12/2013 | Vaughn | |
| 10,507,793 B1 * | 12/2019 | De Moura Partika | G08B 13/19613 |
| 11,618,385 B1 * | 4/2023 | Englander | B60R 1/06 359/838 |
| 2002/0113879 A1 * | 8/2002 | Battle | H04N 1/0014 348/231.3 |
| 2003/0014166 A1 * | 1/2003 | Chinigo | B60R 21/01512 340/433 |
| 2006/0269105 A1 * | 11/2006 | Langlinais | G06V 10/10 382/105 |
| 2009/0195651 A1 * | 8/2009 | Leonard | B60R 1/00 348/148 |
| 2010/0141762 A1 * | 6/2010 | Siann | H04N 23/65 348/372 |
| 2015/0084790 A1 * | 3/2015 | Arpin | H04N 7/188 340/936 |
| 2016/0078576 A1 * | 3/2016 | Su | G06Q 10/0631 705/7.12 |
| 2016/0144788 A1 * | 5/2016 | Perrin, III | B60R 1/00 348/148 |
| 2016/0272112 A1 * | 9/2016 | DeGrazia | B60Q 9/00 |
| 2016/0342850 A1 * | 11/2016 | Elimalech | G08G 1/163 |
| 2016/0350974 A1 * | 12/2016 | Hashimoto | G06F 3/14 |
| 2017/0129458 A1 * | 5/2017 | Ge | B60R 16/0234 |
| 2018/0012492 A1 * | 1/2018 | Baldwin | B60W 10/04 |
| 2018/0211117 A1 * | 7/2018 | Ratti | G06V 10/764 |
| 2018/0268687 A1 * | 9/2018 | Che | G06V 20/54 |
| 2019/0162811 A1 * | 5/2019 | Qiao | G01S 3/805 |
| 2020/0005615 A1 * | 1/2020 | Madden | G06F 18/22 |
| 2020/0130569 A1 * | 4/2020 | Lindsey | G08G 1/0175 |
| 2020/0290567 A1 * | 9/2020 | Funyak | B60R 25/34 |
| 2020/0344602 A1 * | 10/2020 | Li | H04L 67/125 |
| 2021/0134138 A1 * | 5/2021 | Bistany | G01N 15/10 |
| 2021/0250553 A1 * | 8/2021 | Naber, Jr. | B60R 25/302 |
| 2021/0256279 A1 * | 8/2021 | Hergeth | G08B 21/06 |
| 2022/0182159 A1 * | 6/2022 | Pradeep | H04W 24/10 |

FOREIGN PATENT DOCUMENTS

| | | |
|---|---|---|
| CN | 111492416 A | 8/2020 |
| EP | 2530666 A2 | 12/2012 |

OTHER PUBLICATIONS

English Translation of China Office Action for China Application No. 202080000109.9; Action dated Sep. 6, 2021; 6 pages.
English Translation of International Search Report for International Application No. PCT/CN2020074888; dated May 21, 2020; 2 pages.

* cited by examiner

PECCANCY MONITORING SYSTEM AND PECCANCY MONITORING METHOD

CROSS REFERENCE TO RELATED APPLICATIONS

This application is a National Stage of PCT Application No. PCT/CN2020/074888 filed on Feb. 12, 2020, the content of which is incorporated herein by reference thereto.

TECHNICAL FIELD

The present application relates to the field of monitoring technologies, and particularly to a vehicle monitoring system and a vehicle monitoring method.

BACKGROUND

Many countries or regions have clear regulations that, other motor vehicles are not allowed to pass through when a school bus picks up students and is docked on a roadside in order to ensure the safety of students walking across the road, otherwise it will be considered as peccancy.

Technical Problem

At present, when the school bus is docked, the monitoring is required to be artificially implemented depending on the driver of the school bus and the led teacher. However, it is unavoidable for the artificial monitoring to cause an omission, and it is hard for the artificial monitoring to record information about all peccancy vehicles.

SUMMARY

A peccancy monitoring method and a peccancy monitoring system are provided in the embodiments of the present application, which can realize intelligent monitor for peccancy vehicles, so as to reduce the case of detection omission for the peccancy vehicles.

In a first aspect, the embodiments of the present application provide the peccancy monitoring system, which includes:
  a first camera, configured to monitor whether a peccancy vehicle is present in a designated area and generate alarm message when the peccancy vehicle is present;
  a control unit, connected to the first camera and configured to trigger the second camera to shoot according to the alarm message;
  a second camera, connected to the control unit and configured to shoot the peccancy vehicle to acquire a video of the vehicle and an image of the vehicle, here the video of the vehicle is a video containing a license plate of the peccancy vehicle and the image of the vehicle is an image containing the license plate of the peccancy vehicle.

In a second aspect, the embodiments of the present application provide the peccancy monitoring method, which includes:
  monitoring whether a peccancy vehicle is present in a designated area, and generating an alarm message when the peccancy vehicle is present;
  shooting the peccancy vehicle according to the alarm message to acquire a video of the vehicle and an image of the vehicle, here the video of the vehicle is a video containing a license plate of the peccancy vehicle, and the image of the vehicle is an image containing the license plate of the peccancy vehicle.

Beneficial Effects

It can be seen from the above that, the technical solution of the present application forms the peccancy monitoring system based on the first camera, the second camera and the control unit, the first camera is configured to monitor whether a peccancy vehicle is present in a designated area and generate alarm message when the peccancy vehicle is present, the control unit connected to the first camera is configured to trigger the second camera to shoot according to the alarm message, and the second camera connected to the control unit is configured to shoot the peccancy vehicle to acquire the video of the vehicle and the image of the vehicle, here the video of the vehicle is a video containing a license plate of the peccancy vehicle and the image of the vehicle is an image containing the license plate of the peccancy vehicle. By using the technical solutions in the present application, the road can be monitored after the school bus is docked, and when a peccancy vehicle is passing through, the peccancy vehicle can be recorded and the law-executor can issue a ticket for this to reduce peccancy vehicles, thereby guaranteeing the safety of students before they get on the bus and after they get off the bus. It should be understood that, the beneficial effects of the second aspect may refer to related description in the first aspect, which will not be repeated herein again.

DESCRIPTION OF THE DRAWINGS

In order to more clearly illustrate the technical solutions in the embodiments of the present application, the drawings required to be used in the description for the embodiments or the prior art will be briefly introduced below. Obviously, the drawings in the following description are only some embodiments of the present application, and other drawings can be obtained without paying creative labor based on these drawings for those skilled in the art.

IMPLEMENTATIONS OF THE APPLICATION

In the following description, specific details such as a specific system structure and a specific technology etc. are provided for the purpose of illustration rather than limitation, such that the embodiments of the present application are thoroughly understood. However, it should be noted to a person skilled in the art that the present application can also be implemented in other embodiments without these specific details. In other cases, detailed descriptions for well-known systems, devices, circuits, and methods are omitted so as not to obscure the description for the present application with unnecessary details.

It should be understood that the term "comprise", when used in the specification and the appended claims of the present application, indicates the presence of a described feature, entity, step, operation, element and/or component, but does not exclude the presence or addition of one or more other features, entities, steps, operations, elements, components, and/or thereof.

It should also be understood that the term "and/or" used in the specification and the appended claims of the present application refers to any combination and all possible combinations of one or more of the items listed in association, and includes these combinations.

As used in the specification and the appended claims of the present application, the term "if" may be explained as "when" or "once" or "in response to determination" or "in response to detection" according to the context. Similarly, the phrase "if . . . is determined" or "if [the described condition or event] is detected" may be explained to mean "once . . . is determined" or "in response to determination" or "once [the described condition or event] is detected" or "in response to detection of [the described condition or event]" depending on the context.

In addition, in description for the specification and the appended claims of the present application, the terms "first", "second", "third" and the like are only used to distinguish descriptions, and cannot be understood as indicating or implying relative importance.

Reference to "one embodiment" or "some embodiments" and the like described in the specification of the present application means that a particular feature, structure, or characteristic described in connection with this embodiment is included in one or more embodiments of the present application. Thus, the statements "in one embodiment", "in some embodiments", "in some other embodiments", "in other embodiments", etc. appeared at different positions of the specification are not necessarily all refer to the same embodiment, but instead mean "one or more but not all embodiments", unless otherwise specifically emphasized otherwise. The terms "include", "comprise", "is provided with" and their variations all mean "including but not is limited to", unless otherwise specifically emphasized otherwise.

In order to illustrate the above-mentioned technical solutions of the present application, the technical solutions are illustrated below by a way of specific embodiments.

First Embodiment

The embodiments of the present application propose a peccancy monitoring system, which is applied to a vehicle, such as a school bus. Specifically, the peccancy monitoring system applied to the school bus is taken as an example to explain and illustrate the constitution of the peccancy monitoring system. It should be noted that the above peccancy monitoring demand can also be applied to other vehicles requiring peccancy monitoring, which is not limited herein. Please refer to FIG. 1, which shows an architecture diagram of the above-mentioned peccancy monitoring system 1.

Figure 1:
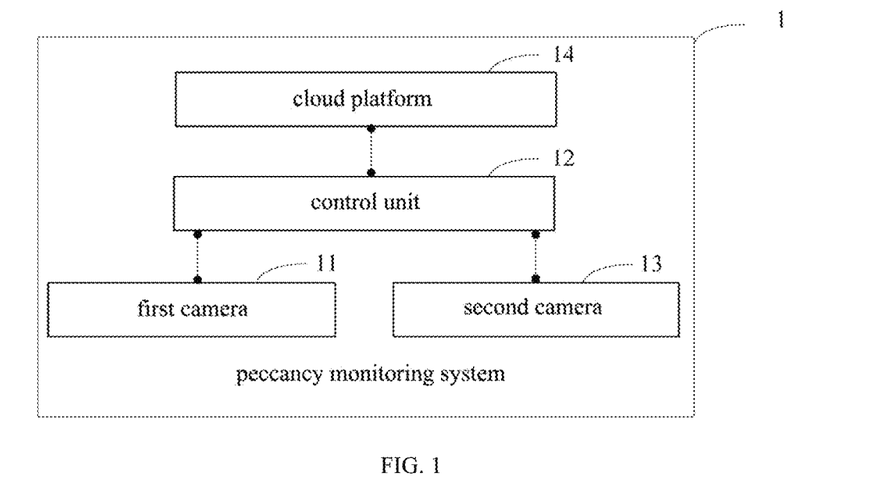
FIG. 1 is a structural block diagram of the peccancy monitoring system provided by an embodiment of the present application.

The peccancy monitoring system 1 specifically includes a first camera 11, a control unit 12 and a second camera 13. Among them, the first camera 11 and the second camera 13 are connected to the control unit 12, and the first camera 11, the control unit 12, and the second camera 13 are mounted on the school bus. Optionally, the above connection may be a wireless connection; of course, the above connection may also be a wired connection on consideration of information transmission speed. The connection manner between the first camera 11 and the control unit 12 and the connection manner between the second camera 13 and the control unit 12 are not limited herein.

Specifically, the first camera 11 is configured to monitor whether a peccancy vehicle is present in a designated area, and generate alarm message when the peccancy vehicle is present.

The control unit 12 is configured to trigger the second camera 13 to shoot according to the alarm message.

The second camera 13 is configured to shoot the peccancy vehicle to acquire a video of the vehicle and an image of the vehicle. Among them, the video of the vehicle is a video containing a license plate of the peccancy vehicle, and the image of the vehicle is an image containing the license plate of the peccancy vehicle.

In an embodiment of the present application, the first camera 11 is specifically an intelligent camera, and the intelligent camera is a camera including an intelligent algorithm. That is, the first camera 11 can shoot videos, and identify and track a movement trajectory of a target vehicle entering the designated area by applying an intelligently processing and analyzing technology on images based on the shot video, so as to determine whether the target vehicle is a peccancy vehicle. Specifically, after the first camera 11 is started, it continuously analyzes the acquired real-time images to avoid the situation of missed inspection for the peccancy vehicle.

Figure 2:
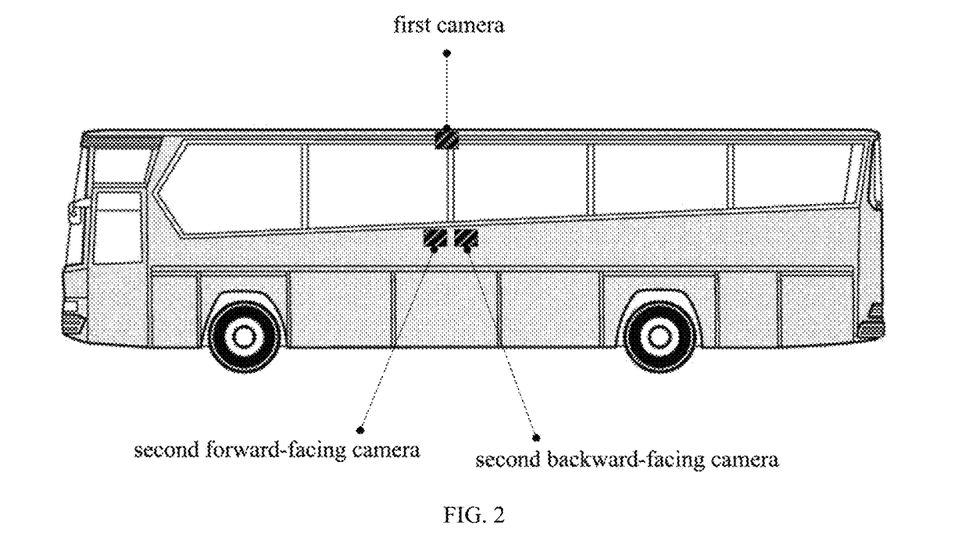
FIG. 2 is a schematic diagram of installation of a first camera and a second camera on a school bus in the peccancy monitoring system provided by an embodiment of the present application.
Figure 3:
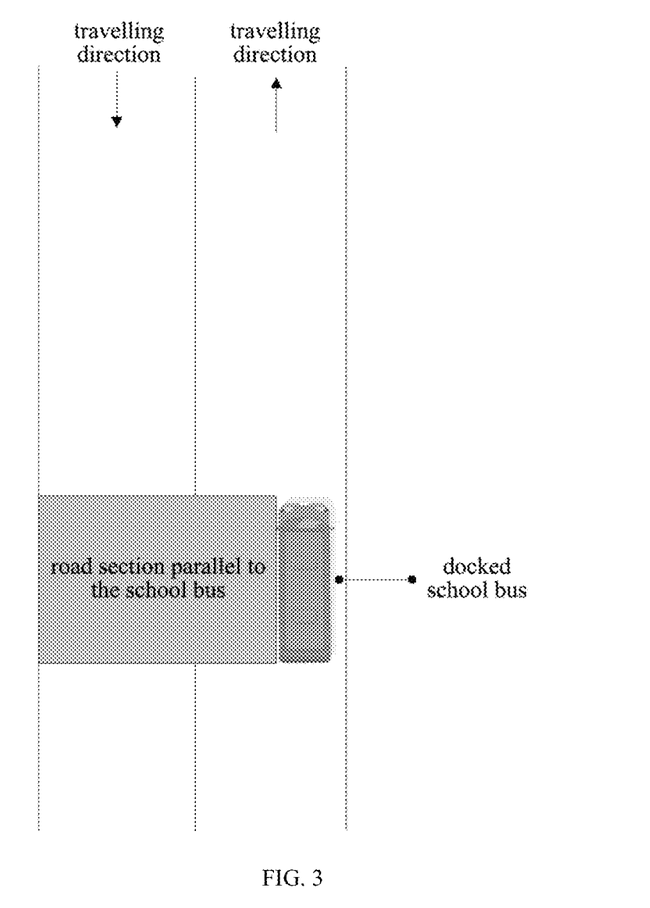
FIG. 3 is a schematic diagram of a road section parallel to the school bus in the peccancy monitoring system provided by an embodiment of the present application.

Optionally, as shown in FIG. 2, the first camera 11 may be mounted on an outside of the vehicle in a middle part of the school bus, and be level with or slightly lower than the top of the vehicle, so as to obtain a better monitoring field of view. Of course, the first camera 11 may be mounted at other positions, as long as it can realize the monitoring for the designated area, which is not limited herein. Please refer to FIG. 3, the designated area at least covers a road section parallel to the school bus, and FIG. 3 provides a schematic diagram of the road section parallel to the school bus. By using the first camera 11 described above, the road can be monitored when the school bus is docked on the roadside, so as to identify in time whether a peccancy vehicle passing is present on the road section where the school bus is docked.

During the monitoring process of the first camera 11, once the existence of the peccancy vehicle in the designated area is monitored, the alarm message may be generated immediately based on the peccancy vehicle. The alarm message may be reported to the control unit 12.

When the control unit 12 receives the alarm message sent by the first camera 11, it may be learnt that a peccancy vehicle is present on the road section where the school bus is currently docked. At this time, in order to realize the information recording for the peccancy vehicle, the control unit 12 may generate a shoot instruction of the second camera 13 based on the alarm message, and send the shoot instruction to the second camera 13 to trigger the second camera 13 to shoot.

After receiving the shoot instruction sent by the control unit 12, the second camera 13 shoots the peccancy vehicle, and specifically shoots an image and shoots a video, so as to acquire an image of the vehicle through the image shooting and acquire a video of the vehicle through the video shooting. Among them, the video of the vehicle is a video containing the license plate of the peccancy vehicle, and the image of the vehicle is an image containing the license plate of the peccancy vehicle. Considering that the first camera 11, the control unit 12 and the second camera 13 are all mounted on the school bus and transmit information in milliseconds, therefore the second camera 13 can shoot the peccancy vehicle in a short period of time after the existence of the peccancy vehicle is monitored by the first camera 11, thereby avoiding the situation that the image of the vehicle and the video of the vehicle do not contain the license plate of the peccancy vehicle due to communication delay and time desynchrony between the first camera 11 and the second camera 13. Specifically, the second camera 13 is a high-definition camera, and its acquired image resolution is very high (for example, it may be 5 MP). By shooting through the second camera 13, the license plate recognition can be performed to help a supervisor see clear the license plate number of the peccancy vehicle and realize the information recording of the peccancy vehicle.

Optionally, since the first camera 11 is provided with a video collection function, the first camera 11 may also be configured to shoot a video in real time during monitoring. Once the existence of a peccancy vehicle is found through monitoring, a start frame and an end frame having shot the peccancy vehicle may be identified from the collected images through the intelligent processing and analyzing technology on the images, and a vehicle travelling video of the peccancy vehicle in the designated area is cut out based on the start frame and the end frame. That is, the vehicle travelling video may record a travelling route of the peccancy vehicle from entering the designated area to leaving the designated area, and the travelling route may be used to indicate a peccancy action of the peccancy vehicle in the designated area. It can be seen that, in an embodiment of the present application, both the first camera 11 and the second camera 13 can shoot a video about the peccancy vehicle, however, the first camera 11 is biased to shoot the peccancy vehicle as a whole entity, that is, shoot the peccancy process of the peccancy vehicle; and the second camera 13 is biased to shoot details, that is, shoot the information of the peccancy vehicle itself, such as the license plate number of the peccancy vehicle.

Optionally, in order to realize information collection on the peccancy vehicle, the first camera 11 may send its acquired vehicle travelling video of the peccancy vehicle to the control unit 12; the second camera 13 may further send its acquired image of the vehicle and video of the vehicle containing the license plate of the peccancy vehicle to the control unit 12; and then the control unit 12 may further be configured to package generation time of the alarm message, the video of the vehicle, the image of the vehicle, and the vehicle travelling video as the peccancy information of the peccancy vehicle. Considering that the first camera 11 is provided with a strong capability of image analyzing and processing, it can be determined in a very short time whether a peccancy vehicle is present in the designated area. Therefore, it can be considered that the generation time of the alarm message is the peccancy time of the peccancy vehicle.

Optionally, in order to avoid misjudgment of a peccancy vehicle, the peccancy monitoring system 1 further includes a cloud platform 14 connected to the control unit 12; and then the control unit 12 is further configured to upload the peccancy information of the peccancy vehicle to the cloud platform. A backstage supervisor (such as a traffic police) can view the peccancy information of the peccancy vehicle sent by the control unit 12 on the cloud platform, and manually review it to determine whether the peccancy vehicle has indeed occurred peccancy. According to a result of the manual review, if the peccancy vehicle has indeed occurred peccancy, then the peccancy vehicle is issued with a ticket by the backstage supervisor. By issuing the ticket, the number of peccancy vehicles is gradually reduced, so as to ensure the safety of the students before they get on and after they get off.

Optionally, the control unit 12 starts to work after the school bus is started, and detects whether the school bus is in a preset docking position in real time. When the school bus is detected in the docking position, the first camera 11 and the second camera 13 are triggered to start up; and when the school bus is not in the docking position, the first camera 11 and the second camera 13 are triggered to shut down to save resources. It should be noted that, the first camera 11 starts real-time monitoring for the designated area immediately after its startup, and the second camera 13 is not required to immediately enter into a state shooting the peccancy vehicle after its startup. In fact, because it cannot be determined when there will be a peccancy vehicle appearing in the designated area, the second camera 13 performs shoot in a period of time after the first camera 11 generates the alarm message (that is, after determining that a peccancy vehicle is present in the designated area).

Specifically, the process of detecting whether the school bus is in the preset docking position by the control unit 12 is as follows: acquiring speed of a global positioning system (GPS), pulse speed, and/or a controller area network (CAN) signal of the school bus, and determining whether the vehicle is in a parking state according to the speed of the GPS, the pulse speed, and/or the CAN signal of the vehicle. That is, whether the school bus has been parked is determined according to the speed of the GPS, the pulse speed, and/or the CAN signal of the vehicle. If the vehicle is determined in the parking state, it may be further determined whether the vehicle is in the preset docking position according to a level state of an access line end of the parking signal board of the school bus, and the docking position is used to indicate that the school bus is currently waiting for students to get on or off. Generally speaking, the school bus is provided with the parking signal board, the driver of the school bus will turn on the parking signal board when the school bus is docked and waits for the students to get on or off, and the access line end of the parking signal board will show a high level once the parking signal board is turned on. Therefore, when the school bus is in the parking state and the level state of the access line end of the parking signal board of the school bus is high, it may be determined that the school bus is currently in the preset docking position, and at this time the first camera 11 and the second camera 13 should be triggered or kept in the startup state. On the contrary, as long as the school bus is determined not in the parking state according to the speed of the GPS, the pulse speed, or the CAN signal of the vehicle, or as long as the access line end of the parking signal board is low, it may be determined that the school bus is currently not in the preset docking position, and at this time the first camera 11 and the second camera 13 should be triggered or kept in the shutdown state.

Figure 4:
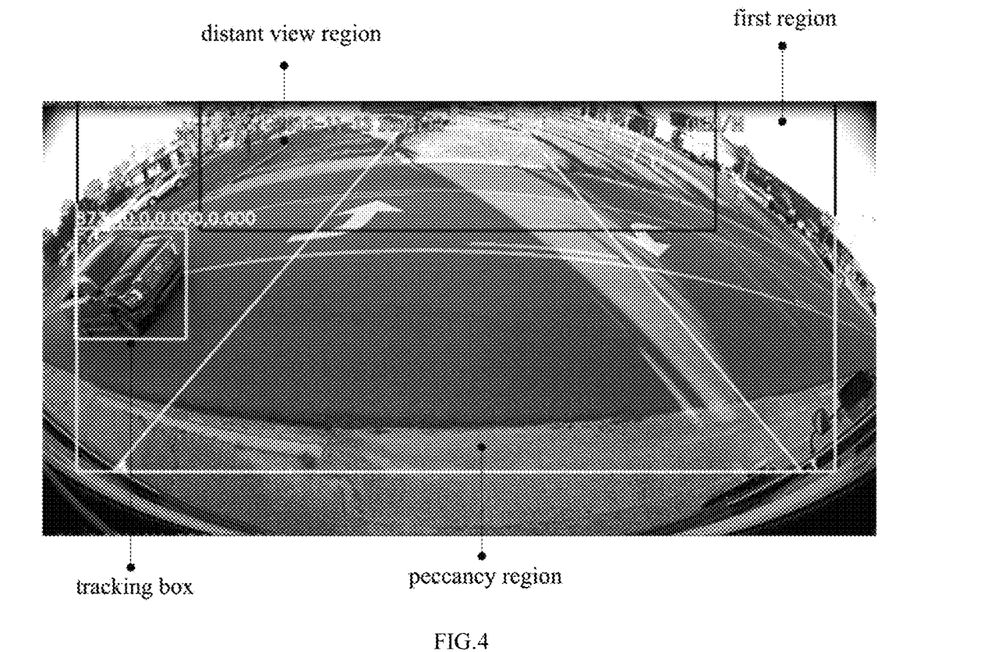
FIG. 4 is a schematic diagram of a picture shot by the first camera in the peccancy monitoring system provided by an embodiment of the present application.

Optionally, the real-time picture shot by the first camera 11 usually contains distortion, resulting in a smaller image present at a distant place in the real-time picture. Based on this, the first camera 11 may acquire a distant view region through dividing from shot real-time picture (i.e., the designated area). As shown in FIG. 4, FIG. 4 shows an example of the designated area (its boundaries constitute a largest rectangular box in FIG. 4 formed by black and white line segments) and an example of the distant view region (its boundaries constitute a medium-sized rectangular box in FIG. 4 formed by black line segments). In order to achieve accurate monitoring for vehicles entering the designated area, the distant view region may be enlarged to obtain an enlarged image, and the first camera 11 monitors the distant view region based on the enlarged image. That is, for the first camera 11, in addition to analyzing its directly acquired images of the entire designated area, the enlarged image (that is, an image acquired by enlarging the distant view region) is also analyzed to realize precise monitoring.

Optionally, the first camera 11 may further acquire a peccancy region through dividing from the designated area, and whether the vehicle entering the designated area occurs a peccancy is determined by using the peccancy region. Specifically, when the target vehicle (that is, the vehicle entering the designated area) is detected, the target vehicle may be identified to acquire a tracking box of the target vehicle, and whether the target vehicle is a peccancy vehicle is determined based on interaction between the tracking box of the target vehicle and the boundaries of the peccancy region. As shown in FIG. 4, FIG. 4 also gives an example of the peccancy region (its boundaries constitute a trapezoidal box in FIG. 4 formed by white line segments) and an example of the tracking box of the target vehicle (a smallest rectangular box in FIG. 4 formed by white line segments). Specifically, the determination of whether the target vehicle is a peccancy vehicle based on the interaction between the tracking box of the target vehicle and the boundaries of the peccancy region may be set based on a user requirement: in one application scenario, when it is detected that the tracking box of the target vehicle is intersected with the boundaries of the peccancy region, that is, when the target vehicle enters into the peccancy region, the target vehicle is considered as having occurred a peccancy, and at this time, the target vehicle is determined to be a peccancy vehicle; in another application scenario, when it is detected that the tracking box of the target vehicle is intersected with different boundaries of the peccancy region (such as a left boundary and a right boundary of the peccancy region), that is, when the target vehicle enters into the peccancy region and then leaves the peccancy region, the target vehicle is considered as having occurred a peccancy, and at this time, the target vehicle is determined to be a peccancy vehicle. Of course, other methods can also be used to determine whether the target vehicle is a peccancy vehicle, which is not limited herein.

Optionally, considering a hang position of the license plate, as shown in FIG. 2, the second camera 13 may be mounted on the outside of the vehicle in the middle part of the school bus and be slightly lower than a lower edge of the vehicle window of the school bus, so as to better shoot license plate of the peccancy vehicle. Further, the second camera 13 may include a plurality of high-definition photographing mechanisms. For example, the second camera 13 may include a second forward-facing camera and a second backward-facing camera, and then the control unit 12 is specifically configured to determine the target second camera 13 from the second forward-facing camera and the second backward-facing camera according to the alarm message and the territory where the vehicle is located, and trigger the target second camera 13 to shoot. For example, when the vehicle is located in America, considering that most American vehicles only hang the license plate at the rear of the vehicle, the license plate of the peccancy vehicle may be shot only when the peccancy vehicle leaves the peccancy region. That is, According to the travelling direction of the peccancy vehicle, the second camera 13 facing toward the leaving direction of the peccancy vehicle among the second forward-facing camera and the second backward-facing camera is determined as the target second camera 13, and the target second camera 13 is triggered to shoot. For example again, when the vehicle is located in China, taking into account that the Chinese vehicle hangs the license plate at both the rear and front of the vehicle, therefore the license plate of the peccancy vehicle may be shot both when the vehicle enters into the peccancy region and when the vehicle leaves the peccancy region. That is, the second forward-facing camera and the second backward-facing camera may both be determined as the target second cameras 13, and these two target second cameras 13 are triggered to shoot, alternatively any one of the second forward-facing camera and the second backward-facing camera 13 is randomly determined as the target second camera 13, which is not limited herein.

Optionally, the control unit may be formed by a video recording mechanism, that is, the control unit may also be provided with a video recording function, and continuously shoot a video for the environment where the vehicle is located during the work of the control unit.

As can be seen from the above, in the embodiments of the present application, whether a vehicle is passing through the road can be monitored in real time by using an image identifying technology when the school bus is docked on the roadside and waits for the students to get on or off, and the monitoring result is fed back to the control unit; when a peccancy vehicle is present, the control unit acquires the vehicle travelling video of the peccancy vehicle through the intelligent camera, and the video of the vehicle and the image of the vehicle containing the license plate of the peccancy vehicle are acquired through the high-definition camera, and the video of the vehicle and the image of the vehicle containing the license plate are integrated as the peccancy information of the peccancy vehicle and are uploaded to the cloud platform for re-check by the backstage supervisor; after re-check and confirmation by the backstage supervisor, a ticket is issued and the peccancy vehicle is provided with penalty. Through the above-mentioned means, the peccancy vehicles can be reduced to a certain extent, and the safety of students before they get on the bus and after they get off the bus can be guaranteed.

Second Embodiment

Figure 5:
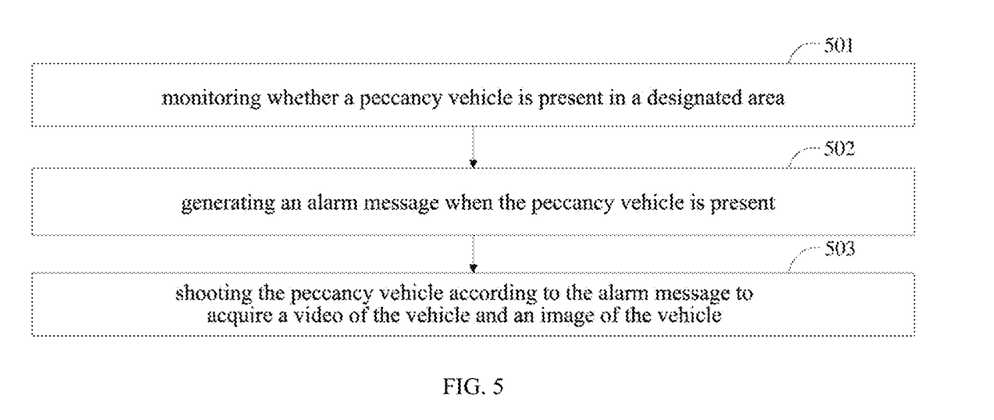
FIG. 5 is a schematic flowchart of implementing the peccancy monitoring method provided by an embodiment of the present application.

The following describes the peccancy monitoring method provided by the embodiments of the present application, and the peccancy monitoring method is applied to the peccancy monitoring system proposed in the above context. Please refer to FIG. 5, the peccancy monitoring method in an embodiment of the present application includes:

at step 501, monitoring whether a peccancy vehicle is present in a designated area;

at step 502, generating an alarm message when the peccancy vehicle is present;

at step 503, shooting the peccancy vehicle according to the alarm message to acquire a video of the vehicle and an image of the vehicle, here the video of the vehicle is a video containing a license plate of the peccancy vehicle, and the image of the vehicle is an image containing the license plate of the peccancy vehicle.

Optionally, the peccancy monitoring method further includes:

shooting a video in real time during monitoring;

acquiring a vehicle travelling video of the peccancy vehicle in the designated area when existence of the peccancy vehicle has been monitored, here the vehicle travelling video is used to indicate a peccancy action of the peccancy vehicle in the designated area.

Optionally, the peccancy monitoring method includes:

packaging generation time of the alarm message, the video of the vehicle, the image of the vehicle, and the vehicle travelling video as peccancy information of the peccancy vehicle.

Optionally, the peccancy monitoring method includes:

uploading the peccancy information of the peccancy vehicle to the cloud platform.

Optionally, the peccancy monitoring method includes:

detecting whether a vehicle is in a preset docking position;

triggering the first camera and the second camera to start up when the vehicle is detected in the docking position, here the first camera is configured to monitor whether the peccancy vehicle is present in the designated area, and the second camera is configured to shoot the peccancy vehicle according to the alarm message;

triggering the first camera and the second camera to shut down when the vehicle is not in the docking position.

Optionally, the step of detecting whether the vehicle is in the preset docking position includes:

determining whether the vehicle is in a parking state according to speed of a GPS, pulse speed, and/or a CAN signal of the vehicle;

determining whether the vehicle is in the preset docking position according to a level state of an access line end of a parking signal board of the vehicle, when the vehicle is in the parking state.

Optionally, the step of monitoring whether the peccancy vehicle is present in the designated area includes:

acquiring a distant view region through dividing from the designated area;

enlarging the distant view region to obtain an enlarged image;

monitoring the distant view region based on the enlarged image.

Optionally, the step of monitoring whether the peccancy vehicle is present in the designated area includes:

acquiring a peccancy region through dividing from the designated area;

identifying the target vehicle when a target vehicle is entering the designated area to acquire a tracking box of the target vehicle;

determining whether the target vehicle is the peccancy vehicle based on interaction between the tracking box of the target vehicle and boundaries of the peccancy region.

Optionally, the second camera includes a second forward-facing camera and a second backward-facing camera, and then the peccancy monitoring method further includes: determining a target second camera from the second forward-facing camera and the second backward-facing camera according to the alarm message and territory where the vehicle is located, and triggering the target second camera to shoot.

As can be seen from the above, based on the peccancy monitoring method proposed by the embodiments of the present application, whether a vehicle is passing through the road can be monitored in real time by using an image identifying technology when the school bus is docked on the roadside and waits for the students to get on or off, and the monitoring result is fed back to the control unit; when a peccancy vehicle is present, the control unit acquires the vehicle travelling video of the peccancy vehicle through the intelligent camera, and the video of the vehicle and the image of the vehicle containing the license plate of the peccancy vehicle are acquired through the high-definition camera, and the video of the vehicle and the image of the vehicle containing the license plate are integrated as the peccancy information of the peccancy vehicle and are uploaded to the cloud platform for re-check by the backstage supervisor; after re-check and confirmation by the backstage supervisor, a ticket is issued and the peccancy vehicle is provided with penalty. Through the above-mentioned means, the peccancy vehicles can be reduced to a certain extent, and the safety of students before they get on the bus and after they get off the bus can be guaranteed.

It will be clearly understood by those skilled in the art that, for convenience and brevity of description, the division of the various functional modules described above is only exemplified. In practical applications, the above functions may be completed through assigning it to different functional modules according to needs. That is, the internal structure of the system is divided into different functional modules to perform all or part of the functions described above. The various functional modules in the embodiments may be integrated into one module, or each of the modules may exist physically separately, or two or more modules may be integrated into one module. The above integrated module may be implemented in a form of hardware, or may be implemented in a form of software functional module. In addition, the specific names of the respective functional modules are only for the purpose of facilitating mutual differentiation, and are not intended to limit the protection scope of the present application. The specific implementing process of the method may refer to the corresponding working process of the functional modules in the foregoing system embodiments, and details of which will be not described herein again.

In the above embodiments, each of the embodiments is described with particular emphasis, and parts that are not detailed or described in a certain embodiment may refer to related description of other embodiments.

Those of ordinary skill in the art will appreciate that, the exemplary modules and method steps described in combination with the embodiments disclosed herein may be implemented by electronic hardware, or a combination of an external device and electronic hardware. Whether these functions are performed in hardware or software depends on a specific application and a design constraint of the technical solution. A person skilled in the art may use different methods to implement the described functions for each particular application, and such implementation should not be considered to be beyond the scope of the present application.

In the embodiments provided by the present application, it should be understood that the disclosed apparatus and method may be implemented in other manners. For example, the system embodiments described above are merely illustrative. For example, the division of the modules is only a division for logical functions, and there may be other division manners in actual implementation, for example, a plurality of modules may be combined or integrated into another system, or some features may be ignored or not executed. In addition, the mutual coupling or direct coupling or communication connection as shown or discussed may be indirect coupling or communication connection through some interfaces, modules, or may be electrical or mechanical, or may be in other forms.

The modules described as separate components may or may not be physically separate. The components shown as modules may or may not be physical modules, that is, may be located in one place, or may be distributed to a plurality of network modules. Some or all of the modules may be selected according to actual needs to achieve the purpose of the solutions of the embodiments.

The module, if implemented in the form of the software functional module and sold or used as a stand-alone product, may be stored in a computer readable storage medium. Based on such understanding, the present application may implement all or part of the processes in the above embodiments through commanding related hardware by a computer program, and the computer program may be stored in the computer readable storage medium. The computer program, when executed by the processor, may implement the steps of the various method embodiments described above. Here, the computer program includes a computer program code, and the computer program code may be in a form of a source code, an object code, an executable file, or some intermediate forms. The computer readable storage medium may include: any entity or apparatus capable of carrying the computer program code, a recording medium, a USB flash disk, a removable hard disk, a magnetic disk, an optical disk, a computer memory, a read-only memory (ROM), a random access memory (RAM), an electrical carrier signal, a telecommunication signal, or software distribution media or the like. It should be noted that, the content contained in the computer readable storage medium may be appropriately increased or decreased according to requirements of legislation and patent practice in a jurisdiction. For example, in some jurisdictions, according to the legislation and the patent practice, the computer readable storage medium does not include the electrical carrier signal and telecommunication signal.

The above embodiments are only used to illustrate the technical solutions of the present application, and are not intended to be limiting. Although the present application has been described in detail with reference to the foregoing embodiments, those of ordinary skill in the art should understand that the technical solutions disclosed in the above embodiments may be modified, or some of the technical features may be replaced by equivalents. These modifications or substitutions do not depart corresponding technical solutions from the spirit and scope of the technical solutions of the embodiments of the present application, and should be included in the protection scope of the present application.

What is claimed is:

1. A peccancy monitoring system, comprising:
   a first camera, configured to monitor whether a peccancy vehicle is present in a designated area and to generate alarm message when the peccancy vehicle is present, wherein the first camera is mounted on an outside of a vehicle in a middle part of the vehicle, and at or slightly below a top of the vehicle;
   a control unit, connected to the first camera and configured to trigger a second camera to shoot according to the alarm message;
   a second camera, connected to the control unit and configured to shoot the peccancy vehicle to acquire a video of the vehicle and an image of the vehicle, the video of the vehicle containing a license plate of the peccancy vehicle, and the image of the vehicle containing the license plate of the peccancy vehicle, wherein the second camera is mounted on the outside of the vehicle in the middle part of the vehicle, and slightly below a lower edge of a window of the vehicle,
   wherein the first camera, the control unit and the second camera are all mounted on the vehicle and transmit information in milliseconds, and
   wherein the first camera is further configured to:
      acquire a peccancy region through dividing from the designated area;
      identify, when a target vehicle is entering the designated area, the target vehicle to obtain a tracking box of the target vehicle, and track a movement trajectory of the target vehicle that has entered the designated area; and
   determine whether the target vehicle is the peccancy vehicle based on interaction between the tracking box of the target vehicle and boundaries of the peccancy region.

2. The peccancy monitoring system according to claim 1, wherein the first camera is further configured to shoot a video during monitoring, such that a vehicle travelling video of the peccancy vehicle in the designated area is acquired when the peccancy vehicle is present, wherein the vehicle travelling video is used to indicate a peccancy action of the peccancy vehicle in the designated area.

3. The peccancy monitoring system according to claim 2, wherein the control unit is further configured to package generation time of the alarm message, the video of the vehicle, the image of the vehicle, and the vehicle travelling video as peccancy information of the peccancy vehicle.

4. The peccancy monitoring system according to claim 3, wherein the peccancy monitoring system further comprises a cloud platform connected to the control unit;
   the control unit is further configured to upload the peccancy information of the peccancy vehicle to the cloud platform.

5. The peccancy monitoring system according to claim 1, wherein the control unit is further configured to: detect whether a vehicle is in a preset docking position, trigger the first camera and the second camera to start up when the vehicle is detected in the docking position; and trigger the first camera and the second camera to shut down when the vehicle is not in the docking position.

6. The peccancy monitoring system according to claim 5, wherein the control unit is specifically configured to: determine whether the vehicle is in a parking state according to speed of a GPS, pulse speed, and/or a CAN signal of the vehicle; and determine whether the vehicle is in the preset docking position according to a level state of an access line end of a parking signal board of the vehicle when the vehicle is in the parking state.

7. The peccancy monitoring system according to claim 1, wherein the first camera is specifically configured to: acquire a distant view region through dividing from the designated area; enlarge the distant view region to obtain an enlarged image; and monitor the distant view region based on the enlarged image.

8. The peccancy monitoring system according to claim 1, wherein the second camera comprises a second forward-facing camera and a second backward-facing camera, and the control unit is specifically configured to: determine a target second camera from the second forward-facing camera and the second backward-facing camera according to the alarm message and territory where the vehicle is located, and trigger the target second camera to shoot.

9. A peccancy monitoring method, comprising:
   monitoring, through a first camera, whether a peccancy vehicle is present in a designated area, and generating an alarm message when the peccancy vehicle is present, wherein the first camera is mounted on an outside of a vehicle in a middle part of the vehicle, and at or slightly below a top of the vehicle;

triggering by a control unit, according to the alarm message, a second camera to shooting the peccancy vehicle, so as to acquire a video of the vehicle and an image of the vehicle, the video of the vehicle containing a license plate of the peccancy vehicle, and the image of the vehicle containing the license plate of the peccancy vehicle, wherein the second camera is mounted on the outside of the vehicle in the middle part of the vehicle, and slightly below a lower edge of a window of the vehicle, wherein the first camera, the control unit and the second camera are all mounted on the vehicle and transmit information in milliseconds, and wherein said monitoring, through the first camera, whether the peccancy vehicle is present in the designated area further comprises:
  acquiring a peccancy region through dividing from the designated area;
  identifying, when a target vehicle is entering the designated area, the target vehicle to obtain a tracking box of the target vehicle, and tracking a movement trajectory of the target vehicle that has entered the designated area; and determining whether the target vehicle is the peccancy vehicle based on interaction between the tracking box of the target vehicle and boundaries of the peccancy region.

\* \* \* \* \*